United States Patent
Ng et al.

(10) Patent No.: US 11,601,481 B2
(45) Date of Patent: Mar. 7, 2023

(54) IMAGE-BASED FILE AND MEDIA LOADING

(71) Applicant: Spatial Systems Inc., New York, NY (US)

(72) Inventors: Peter Ng, San Francisco, CA (US); Jinha Lee, New York, NY (US); Anand Agarawala, New York, NY (US)

(73) Assignee: SPATIAL SYSTEMS INC., New York, NY (US)

( * ) Notice: Subject to any disclaimer, the term of this patent is extended or adjusted under 35 U.S.C. 154(b) by 227 days.

(21) Appl. No.: 17/002,260

(22) Filed: Aug. 25, 2020

(65) Prior Publication Data

US 2022/0070230 A1   Mar. 3, 2022

(51) Int. Cl.
| | | |
|---|---|---|
| *H04L 12/00* | (2006.01) | |
| *H04L 65/1089* | (2022.01) | |
| *H04L 67/06* | (2022.01) | |
| *G06F 16/54* | (2019.01) | |
| *G06F 16/51* | (2019.01) | |
| *H04L 65/402* | (2022.01) | |

(52) U.S. Cl.
CPC .......... *H04L 65/1089* (2013.01); *G06F 16/51* (2019.01); *G06F 16/54* (2019.01); *H04L 65/4025* (2022.05); *H04L 67/06* (2013.01)

(58) Field of Classification Search
CPC ..... H04L 29/06; H04L 29/08; H04L 65/4025; H04L 67/06; H04L 65/1089; G06F 16/51; G06F 16/54

USPC ........ 709/200, 201; 704/204; 707/609, 705, 707/821, 822, 826
See application file for complete search history.

(56) References Cited

U.S. PATENT DOCUMENTS

| | | | | |
|---|---|---|---|---|
| 8,806,350 | B2* | 8/2014 | Krishnan | H04M 1/72457 715/747 |
| 8,843,825 | B1* | 9/2014 | Whitman | G06F 16/9535 715/764 |
| 8,954,863 | B2* | 2/2015 | Khouri | G06F 3/0482 715/712 |
| 9,300,701 | B2* | 3/2016 | Smarr | G06Q 10/10 |
| 9,571,874 | B2* | 2/2017 | Bhatia | H04N 21/4788 |
| 9,706,000 | B2* | 7/2017 | Bostrom | G06Q 10/10 |
| 9,967,294 | B2* | 5/2018 | Kang | H04L 65/612 |
| 10,467,630 | B2* | 11/2019 | Iyer | G06F 16/33 |
| 10,799,168 | B2* | 10/2020 | El Kaliouby | G06K 9/6201 |
| 2019/0250795 | A1* | 8/2019 | Weldemariam | G06F 3/0483 |

\* cited by examiner

*Primary Examiner* — Frantz Coby
(74) *Attorney, Agent, or Firm* — Sterne, Kessler, Goldstein & Fox P.L.L.C.

(57) ABSTRACT

Disclosed herein are various embodiments for an augmented reality contextual menu system. An embodiment operates by receiving a request to open a file from a user. A social media channel associated with the user is identified, wherein the social media channel includes shared media. A graphical social icon representing the social media channel is generated based on the shared media. A plurality of icons, including the graphical social icon, are displayed responsive to the request. A selection of the graphical social icon causes at least a portion of the social media channel to be rendered with a computing workspace.

20 Claims, 6 Drawing Sheets

IMAGE-BASED FILE AND MEDIA LOADING

BACKGROUND

Allowing users to open files is an essential part of any computing system. The types of files that can be opened can vary depending on the capabilities of the particular computing system. The files may include, for example, word processing, spreadsheet, images, videos, models, or other multimedia files. For a user, opening a file usually involves selecting a file based on a particular file name. However, files can be misnamed or file names can be ambiguous or deceiving about what actual contents are included in the file. As such, the only way a user can see what is contained in the file is by actually opening the file, which consumes unnecessary computing resources when the wrong file is opened.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Allowing users to open files is an essential part of any computing system. The types of files that can be opened can vary depending on the capabilities of the particular computing system. The files may include, for example, word processing, spreadsheet, images, videos, models, or other multimedia files. For a user, opening a file usually involves selecting a file based on a particular file name. However, files can be misnamed or file names can be ambiguous or deceiving about what actual contents are included in the file. As such, the only way a user can see what is contained in the file is by actually opening the file, which consumes unnecessary computing resources when the wrong file is opened.

Figure 1:
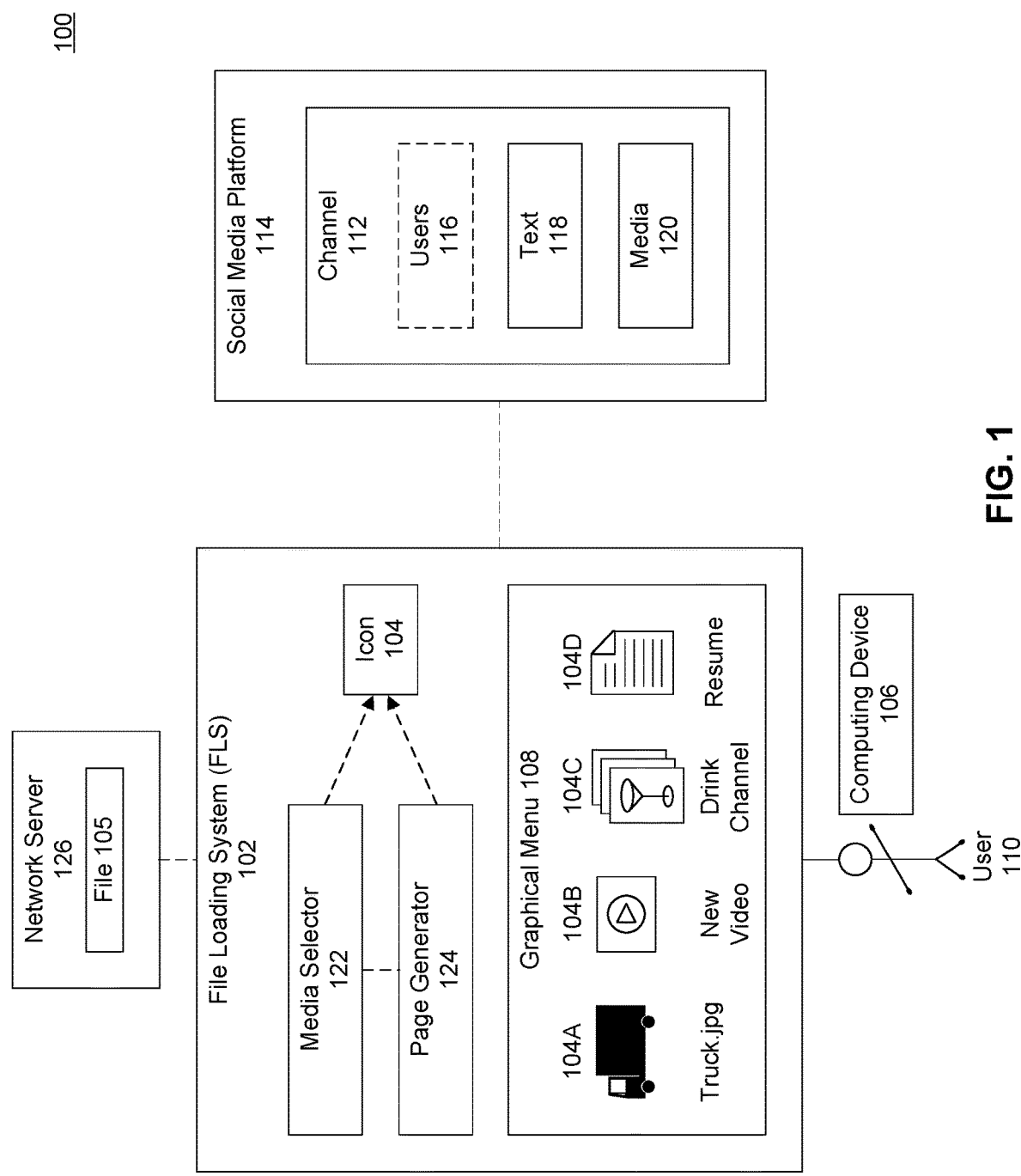
FIG. 1 is a block diagram of a system for providing image-based file and media loading functionality, according to some example embodiments.

FIG. 1 is a block diagram 100 of a system for providing image-based file and media loading functionality, according to some example embodiments. Rather than providing just a file name or a generic icon representing a general file-type, file loading system (FLS) 102 generates file-specific icons 104 for each file 105 that can be loaded into or accessed from a computing device 106.

In an embodiment, the file 105 may be stored and accessed on or from a network server 126, which may include a device in cloud computing environment. In another embodiment, the file 105 may be retrieved from network server 126 and opened or saved locally on computing device 106. In another embodiment, file 105 may be stored locally on computing device 106.

Computing device 106 may be a mobile phone, laptop, desktop, SMART device such as smart television, Internet of Things (JOT) device, or even a augmented reality (AR) or virtual reality (VR) headset or goggles, or other computing device. Network server 126 may be any network accessible computing device, such as a server, that can transmit data to computing device 106. While FLS 102 is illustrated as being its own device in FIG. 1, in other embodiments, FLS 102 may be integrated as part of network server 126 and/or computing device 106.

Icon 104 may provide a user 103 with greater context or information as to the contents of the file 105 beyond than just providing a filename and file type. In an embodiment, FLS 102 may generate a preview of the actual contents of file 105 as icon 104. For example, if file 105 is an image file, then the image, or a portion of the image, may be selected as icon 104. In an embodiment, FLS 102 may parse through the contents of the file 105 and select a portion of file 105 to provide as icon 104. For example, FLS 102 may select a portion of text from a word processing document, and use the text as icon 104 for the document or file 105. Or, for example, FLS 102 may select a chart as an icon 104 from a spreadsheet document or a word processing document that includes a chart.

In an embodiment, the icons 104 may be configured to allow a user 110 to interact with the icons 104 without opening the underlying file 105. For example, a user may read the text, scroll the file, play the video, even zoom in and zoom out of icon 104.

A graphical menu 108 may be used to display one or more file-specific icons 104A-D that have been generated by FLS 102, according to an example embodiment. Graphical menu 108 may include a file folder, or a menu in an application or program that allows a user to select which of one or more files 105 open or attach to another document or email. In an embodiment, graphical menu 108 may include the home screen of a mobile phone with a number of different apps or files 105 that are accessible, each of which has its own icon 104A-D as generated by FLS 102.

Icon 104A may be an icon representing an image file called truck.jpg. Rather than showing a generic image that represents an image file that could apply to any image file, FLS 102 may generate icon 104A that is an actual resized or shrunken down image of the truck that a user may see when actually opening the file. Or for example, user 110 may indicate which portion of the truck image the user 110 wants FLS 102 to use for icon 104A.

In an embodiment, the image file truck.jpg may be a picture of a truck, a drawing of a truck, or a 3D (three dimensional) model of a truck. As such, the icon 104 may be the picture of the truck, the drawing of the truck, or the 3D model of the truck, respectively. The 3D model of the truck may be interactive from graphical menu 108, enabling a user to scroll, manipulate, or see the different sides of the truck, or the truck may be rotating on one or more axes.

As such, rather than requiring the user to open the file to examine the file contents to see the truck, this information may be provided directly via icon 104A. This may minimize the likelihood of user 110 opening and loading the wrong truck image, and then having to open multiple images to find the right truck image, thus wasting valuable time and computing resources. In an embodiment, FLS 102 may previously examine or scan the contents of the image files, and extract the images to be used to represent the images in a file folder or graphical menu 108.

Icon 104B represents an icon 104 for a multimedia file, such as a video file 105. In an embodiment, rather than simply showing a still frame of the video, FLS 102 may actually play the video, or a portion of the video within the graphical menu 108. Or, for example, icon 104B may be a playable video which a user can watch directly from graphical menu 108. In an embodiment, the video icon 104B may be a selection of video and play from the beginning of the video and continue playing the video file until a file selection has been made or a user pauses the playback. In an embodiment, this video icon 104B playback may be done with or without sound.

In another embodiment, the video icon 104B may select a portion of the video to play once, or on a loop while the graphical menu 108 is displayed. For example, FLS 102 may configure video icon 104B to play the most recent 30 seconds of the video as previously viewed by the user 110 who is requesting the opening of the file.

In an embodiment, the video clip played within video icon 104B may be user-specific. For example, the video clip that is played for the video file may vary if a different user 110 who has last seen a different part of the video stopped watching at a different portion of the video is accessing the graphical menu 108.

Icon 104D represents a word processing document called resume. Rather than displaying a generic word processing file icon, the icon 104D actually includes real text and/or formatting as copied or extracted from the underlying resume word processing document. For example, the icon 104D may include the name, address, and work experience text extracted from the resume document which is readable from icon 104D. Or, for example, the icon 104D may include lines representing text that are organized or formatted in a similar manner as the actual text of the underlying word processing document, while the actual text may be unreadable.

This additional information within icon 104D provides the user with additional context so the user can validate and/or more quickly and easily decide whether or not this is the correct file to open. For example, the user may have different versions of their resume available to open. In an embodiment, a user 103 may indicate which portion of a word processing or other document the user wants to be used as icon 104 representing the document. As such, different users may indicate different portions of the same file, and thus see a different icon 104 for the same file.

In an embodiment, if a word processing document includes both text and images, then FLS 102 may select one or more of the images as representing the document as icon 104D. As is discussed in greater detail below, multiple images or media 120 may be used to represent any file 105 as part of icon 104.

In an embodiment, FLS 102 may also generate a social media icon 104C. Social media icon 104C may include content that may have been shared across one or more social media channels 112 on a social media platform 114. Social media platform 114 may include any computing system or platform that enables electronic communications between two or more users 116 of the platform. The social media platform 114 may allow comments, likes, sharing, direct messaging, group messaging, text or video chats, posts, and other functionality to be performed by and between users. Example social media platforms 114, include but are not limited to, SLACK, FACEBOOK, INSTAGRAM, LINKEDIN, TWITTER, WHATSAPP, ZOOM, and may include text message or email systems.

Social media channel 112 may include one or more grouped and saved or live messages or interactions between a subset of users 116 on a particular social media platform 114, and may include both public and private messages. Example channels 112 may include direct messages between two users 116, an ongoing video meeting, a saved workspace in an augmented reality (AR) computing environment, or another digital space where two or more users can post text 118 or media 120 that can be seen, accessed, viewed, edited, or commented on by other users.

In an embodiment, channel 112 may include text 118 and media 120 posted by various users 116 about a particular project or workgroup within an organization or other subject. Users 116 may include any user or user IDs that are participating or available to participate in a social media channel 112. The text 118 may include emails, comments, posts, or chats, across any number of languages. The media 120 may include images, videos, word processing files, audio files, or other documents or multimedia files that were posted to or shared via social media platform 114 to one or more users 116 across one or more channels 112. In an embodiment, channel 112 may include a particular user's homepage or home screen where the user posts content.

A media selector 122 may scan the media 120 posted to a particular channel 112, and select one or more pieces of media 120 may be used to generate an icon 104 for the channel 112 in a graphical menu 108. In an embodiment, if multiple pieces of media (e.g., images, video, audio files, or other multimedia) have been posted to channel 112, media selector 122 may select which media file(s) are to be used to represent channel 112 in graphical menu 108.

In an embodiment, media selector 122 may select the most recent media 120 posted to channel 112 or the most recent media posted by user 110 to channel 112 as the icon 104 that is going to represent channel in graphical menu 108. In an embodiment, the media 120 selected by media selector 122 may include the most recent media 120 on which the user posted, commented, or liked. In an embodiment, media selector 122 may select multiple pieces of media 120 from channel 112, which may be assembled together by a page generator 124.

In an embodiment, if channel 112 is live, whereby different users 116 are actively posting media 120 such as images or videos and/or text 118, media selector 122 may continually retrieve and update icon 104C to reflect the most recently added media 120 and/or text 118. Media selector 122 may also update the image of any other file 105 that is being updated prior to selection by user 110. For example, resume may be a file 105 stored in a cloud environment that is being updated by a different user who is posting and removing images or media from the resume. In an embodiment, media selector 122 may detect or receive the image or text updates and update the icon 104D accordingly.

In an embodiment, media selector 122 may only select media 120 that was posted within a particular time frame, such as within the previous 6 months or 4 weeks, etc. Or only media 120 that was posted by a specific user. In an embodiment, if no media 120 is available, then media selector may select a portion of text 118, a list of one or more users 116 or contributors to the channel, or an general icon representing the social media platform 114.

In an embodiment, user 110 may specify which media 120 of a channel 112 the user wants to represent the channel 112 in graphical menu 108. Then media selector 122 may extract or copy that portion of media 120 or content for at least a portion of icon 104C. For example, any user 110 designated media may be the first page(s) of social media icon 104C.

Page generator 124 may generate scrollable pages of selected media 120 for a particular file 105 or social media channel 112. For example, the social media icon 104C for the drink channel shows the first image of a *martini* glass that was posted to the drink channel. As can be seen, the social media icon 104C includes multiple other media on different pages behind the drink icon that may be scrolled through from graphical menu 108. For example, the second page or media of social media icon 104C may be a video that was posted, the third media or page may be a title of an audio file (or an album cover if available). In an embodiment, user 103 may manually scroll through the pages of social media icon 104C, or the pages may periodically change or be updated.

In an embodiment, if multiple media 120 are selected for social media icon 104C (or any other icon 104), then media selector 122 or page generator 124 may select a key or primary picture that appears first to user 110. Media selector 122 may prioritize the order of the media based on when it was posted to channel 112 (e.g., with the most recent appearing first), or may select that media posted by user 110 first. As illustrated, the *martini* glass image was selected as the first image for the drink channel social media icon 104C.

As noted above, user 110 may use computing device 106 to scroll through the various media of social media icon 104C displayed in graphical menu 108 without opening or accessing social media channel 112. In an embodiment, the user 110 may either manually page through the various media of social media icon 104C, or the media may automatically scroll without user interaction based on a timer (e.g., every 3 seconds). In an embodiment, if the media of an icon 104 includes audio or video media, then that media may be played within graphical menu 108.

Figure 2:
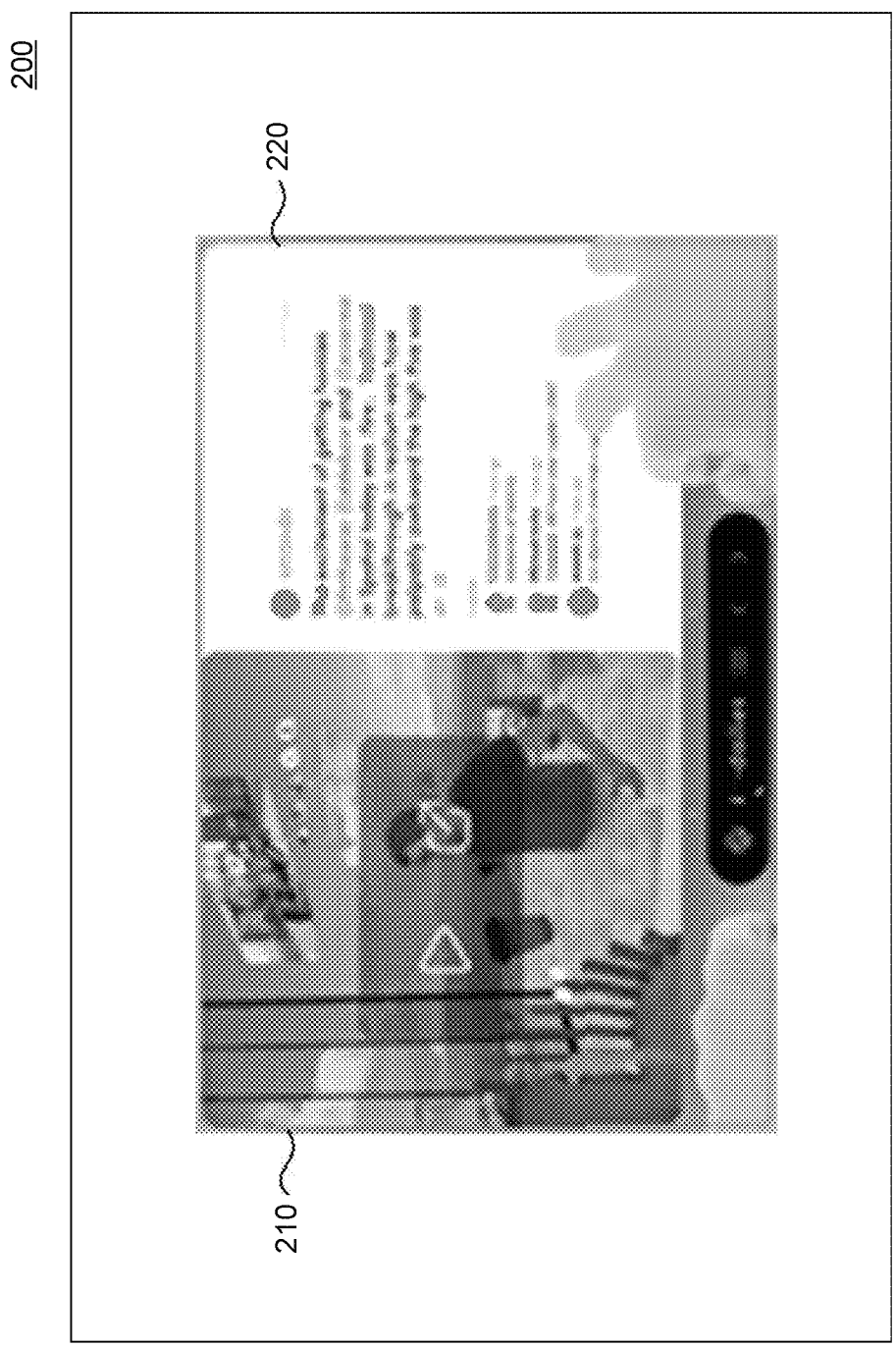
FIG. 2 illustrates an example social media icon, according to an example embodiment.

FIG. 2 illustrates an example social media icon 200, according to an example embodiment. As illustrated, the social media icon 200 may include a portion of video media 210 and text media 220 that are selected by media selector 122 and assembled together by page generator 124 to create the icon 200. For example, FLS 102 may select the most recent media 210 posted to channel 112 (which user 110) has seen, and include any comments, messages, or text 220 that were provided with the media 210. Page generator 124 may assemble both media 210 and text 220 into a single icon 200 which is visible via a graphical menu 108.

Then, for example, user 110 has an option to open the corresponding social media channel, play the video clip 210 (or portion thereof), and/or read the text 220 from graphical menu 108 without first opening or accessing social media channel 112. This may be particularly helpful in allowing the user to more quickly and accurately select the correct channel 112 to open.

In an embodiment, media selector 122 may be a file or social media crawler that has access to the social media channels of user 110. The crawler may track and store relevant media 120 that may be used to represent channel 112 in graphical menu. In an embodiment, a user 110 may specifically indicate to media selector 122 which media 120 to use for a social media icon 200 based on media name, date uploaded, comments, likes, the userID or other information.

In an embodiment, the hands may illustrate the ability of a user to access social media icon 200 in an AR/VR computing environment, as discussed in greater detail below. For example, using a particular hand gesture, the user may scroll the text 220 and/or play the video 210 without opening the social media channel 112 or underlying file 105.

Figure 3:
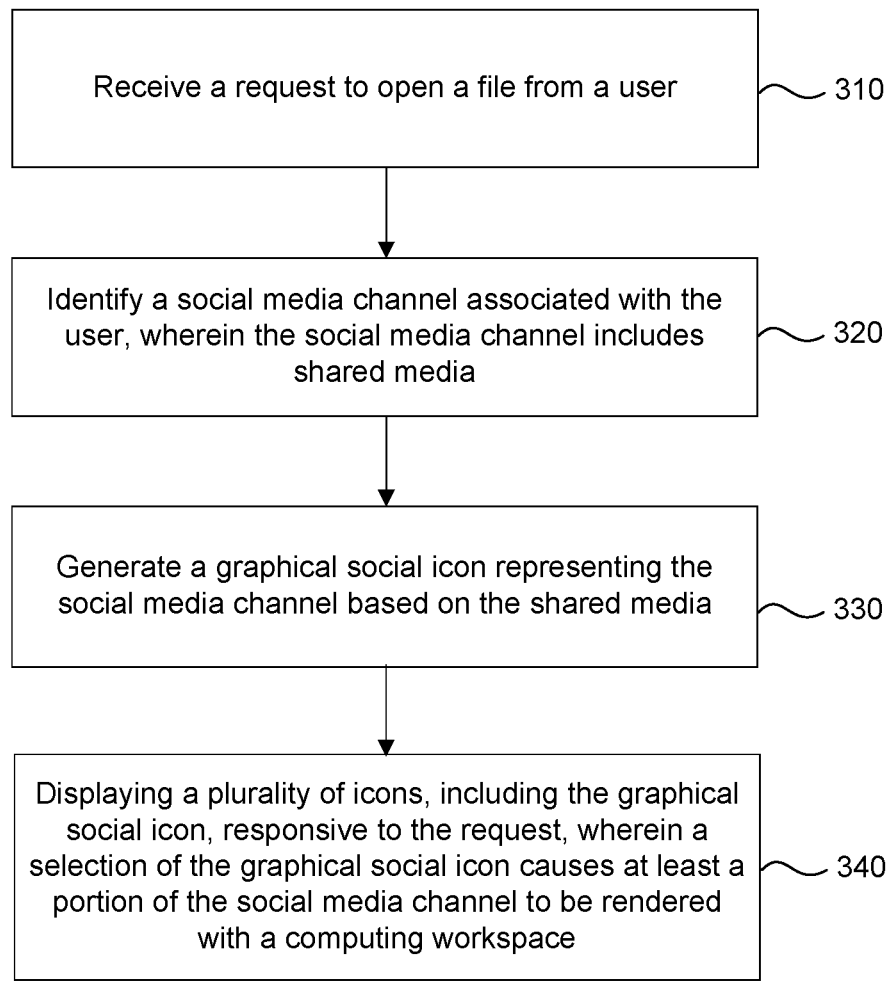
FIG. 3 is a flowchart illustrating example operations for providing image-based file and media loading functionality, according to some embodiments.

FIG. 3 is a flowchart 300 illustrating example operations for providing image-based file and media loading functionality, according to some embodiments. Method 300 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 3, as will be understood by a person of ordinary skill in the art. Method 300 shall be described with reference to the figures.

In 310, a request to open a file is received from a user. For example, FLS 102 may receive a request from user 110 to open a file 105 on computing device 106. Computing device 106 may be a mobile phone, laptop, desktop, or AR or VR enabled headset.

In 320, a social media channel associated with the user is identified, wherein the social media channel includes shared media. For example, the accounts of user 110 across one or more social media platforms 114 may be accessed (upon authorization by user 110). The channels 112 may be scanned for any media 120 that has been posted or shared by user 110 or other users 116 which are part of social media platform 114 or one or more channels 112 on the platform 114.

In 330, a graphical social icon representing the social media channel is generated based on the shared media. For example, media selector 122 may select one or more pieces of media 120 from channel 112 to use in an icon 104 representing the channel 112. A page generator 124 may arrange the selected media 120 across one or more scrollable pages in an icon 104C.

In 340, a plurality of icons, including the graphical social icon, are displayed responsive to the request. For example, a graphical menu 108 may display various icons 104A-D that are selectable by user 110 to open the associated programs or files on computing device 106.

In an embodiment, the social media platform 114 may be represented by an icon or logo of the social media platform 114 in a top-level graphical menu 108. Then, upon receiving a selection of the social media icon 104C representing the social media platform 114 from the top-level graphical menu 108, FLS 102 may open a new menu specific to the selected social media platform 114. The new, lower level menu may then include a plurality of social media icons 104C each corresponding to a different social media thread or channel 112 with which the user 110 is associated or has participated or joined.

For example, an icon 104 for INSTAGRAM may appear in graphical menu 108, and upon selecting the INSTAGRAM icon 104, a new graphical menu 108 illustrating icons 104 for direct message threads, images on which the user 110 commented or posted, and users 116 the user 110 is following may be displayed and selectable.

Figure 4:
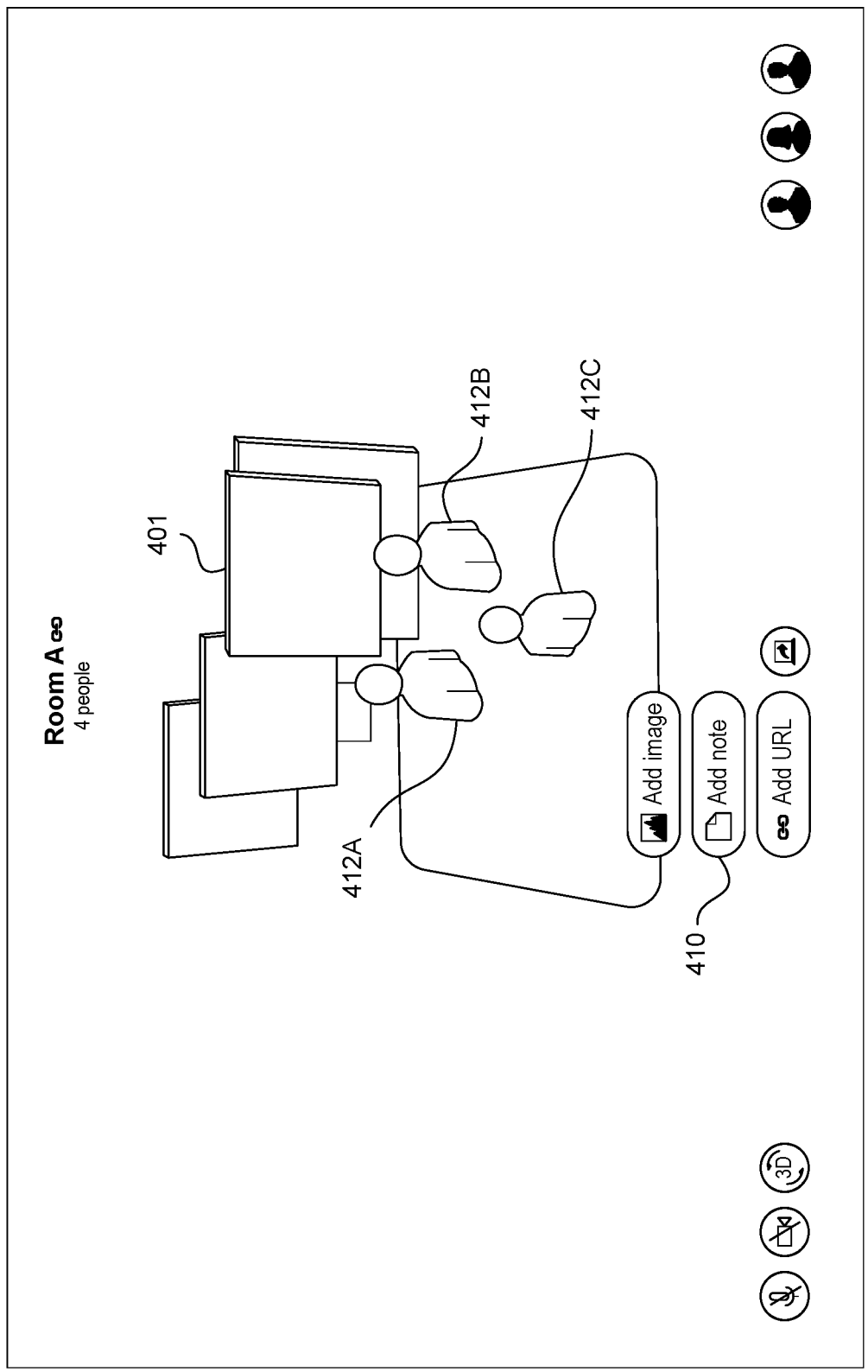
FIG. 4 is example screen display of a spectator view including a content-drop menu, according to some embodiments.

FIG. 4 is example screen display of a spectator view of an augmented reality (AR) computing environment, according to some embodiments. The screen display provided in FIG. 4 is merely exemplary, and one skilled in the relevant art(s) will appreciate that many approaches may be taken to provide a suitable screen display in accordance with this disclosure.

Content menu 410, an example contextual menu, may allow a user to upload content from their mobile device, laptop computer, or other computing device into the AR meeting space. Content menu 410 may be accessed by a user engaging drop-content button 405. For example, a user may add an image or photograph from their device, copy a link into the AR meeting space, or add a sticky note as a digital object into the AR meeting space. In another embodiment, the content menu 410 may be expanded from and/or collapsed into a menu icon as described herein. In an embodiment, content menu 410 may an example embodiment of a graphical menu 108 and include various icons 104.

Avatars 412A-C may be representations of users active in an AR meeting space. Avatars 412 may uniquely identify and distinguish a user in the system from other users, allowing the viewing user to easily determine the identity of the user in the AR meeting space, on the AR meeting space launcher, or elsewhere in the AR system. Room A indicates four people are in the room, while only 3 avatars 412A-C are illustrated. In an embodiment, the fourth user may not see their full avatar and may account for the fourth person. However, the fourth person may see their hands when interacting with digital objects within the AR space.

Numerous approaches may be taken to create an avatar in the AR meeting space. In one embodiment, a user may create an avatar manually that represents their digital selves. In another embodiment, a user may upload an image and the image may be displayed as the user in the AR meeting spaces. In another embodiment, a video feed may be captured, e.g., by a webcam or camera on a mobile device, and the video feed placed in the AR meeting space to represent the user. In another embodiment, a mobile device may use a real-time face capture, e.g., using infrared, and AR/VR cloud system may assemble this into a digital representation in the AR meeting space that moves with the users facial expressions.

Figure 5:
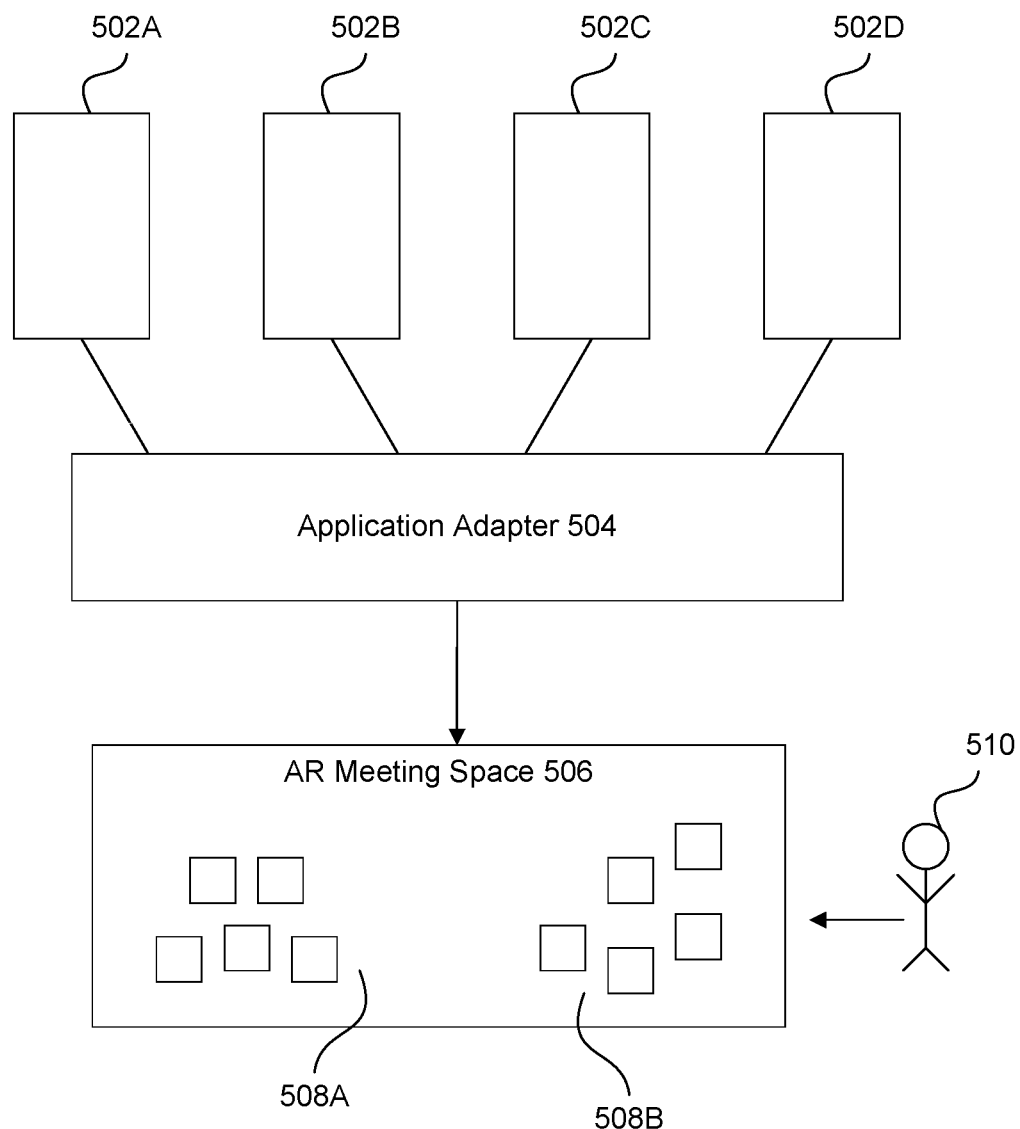
FIG. 5 is a block diagram of AR environment, according to some embodiments.

FIG. 5 is a block diagram of AR environment 500, according to some embodiments. Any operation herein may be performed by any type of structure in the diagram, such as a module or dedicated device, in hardware, software, or any combination thereof. Any block in the block diagram of FIG. 5 may be regarded as a module, apparatus, dedicated device, general-purpose processor, engine, state machine, application, functional element, or related technology capable of and configured to perform its corresponding operation(s) described herein. AR environment 500 may include media sources 502, application adapter 504, AR meeting space 506, three-dimensional representation 508, and user 510.

Media sources 502 may include social media, news feeds, web sites, email feeds, search results, and many other media types that are capable of providing structured data to AR/VR (virtual reality) cloud system for representation in an AR meeting space in three dimensions. Examples of social media may include feeds from FACEBOOK, INSTAGRAM, TWITTER, etc. Examples of web sites include news sites, such as THE WASHINGTON POST or THE NEW YORK TIMES, or any other web site available via the world wide web or other hypertext transfer protocol. Media sources may provide an RSS feed that may be accessed by AR/VR cloud system to pull/retrieve information from the media source. Such an RSS feed may be filtered to include information relevant to a particular user or subset of users within the AR system. An email feed may be accessed through a suitable email protocol, e.g., SMTP, POPS, etc.

Application adapter 504 may transform structured data, include models, received from the media source into a three-dimensional representation. Application adapter 504 may identify a source of the media and deploy a customized, enhanced adapter if the source is known and such an enhanced adapter exists. Application adapter 504 may employ a default adapter where the source and/or type is not known. A default adapter may provide baseline interaction techniques by representing the structured data in a simplistic fashion.

To transform the data, application adapter 504 may identify content provided by the media source while dividing the content into appropriate sections or groups. For example, in an RSS feed, application adapter 504 may divide information "<item>" tags into separate sections. For another example, for a web page, application adapter 504 may break down a particular web page into sections based on <iframe> tags, <section> tags, etc. Application adapter 504 may extract from the structured data images, videos, sound files, etc. to be associated/displayed with the determined content and/or sections.

By grouping the received data into sections that may be manipulated, application adapter 504 may select an appropriate three-dimensional interaction model to apply to the three-dimensional representation. For example, if the media source is a news feed, a three-dimensional representation may be displayed that is tailored to allow users to interact with news feed. In another example, if the media source is a WIKIPEDIA page, then an appropriate three-dimensional representation may be provided that is specific to WIKIPEDIA entries. The breadth and scope of functionality that is available to users when viewing the three-dimensional representation may vary according to the type of media source being viewed. Advanced techniques to sort, group, search, organize, view, etc. data may be available in three dimensions that are not available in two dimensions.

Application adapter 504 may be further enhanced to apply particularized expectations about a specific media source to derive additional information to include in the three-dimensional representation. For example, a particularized adapter may be deployed to parse a NEW YORK TIMES news feed that differs from a particularized adapter deployed to a comparable WASHINGTON POST news feed. Such an enhanced application adapter may gather additional information from the structured data provided by the media source and render incorporate that information into the three-dimensional representation.

AR meeting space 506 is an augmented reality meeting space, as described in detail above. Application adapter 504 may provide a three-dimensional representation to AR/VR cloud system to recreate in AR Meeting Space 506.

3D representations 508, such as 3D representation 508A and 508B may be displayed in AR meeting space 506 to represent the structured data received from media sources 502 and transformed by application adapter 504. Various media sources are described throughout this disclosure specifically with respect to their representation in AR meeting spaces in three dimensions, e.g., as 3D representations 508.

These three-dimensional representations are merely exemplary, but provide suitable examples of three-dimensional representations of social media feeds, web pages, and search results. Additional three-dimensional representations may be developed to display other media sources, such as email feeds, tasklists, and any other suitable structured data that may be received from an external source and represented in three dimensions in an AR meeting space.

User 510 may view three-dimensional representations 508 in AR meeting space 506 using an AR headset, or in other embodiments, a mobile device or laptop computer.

Figure 6:
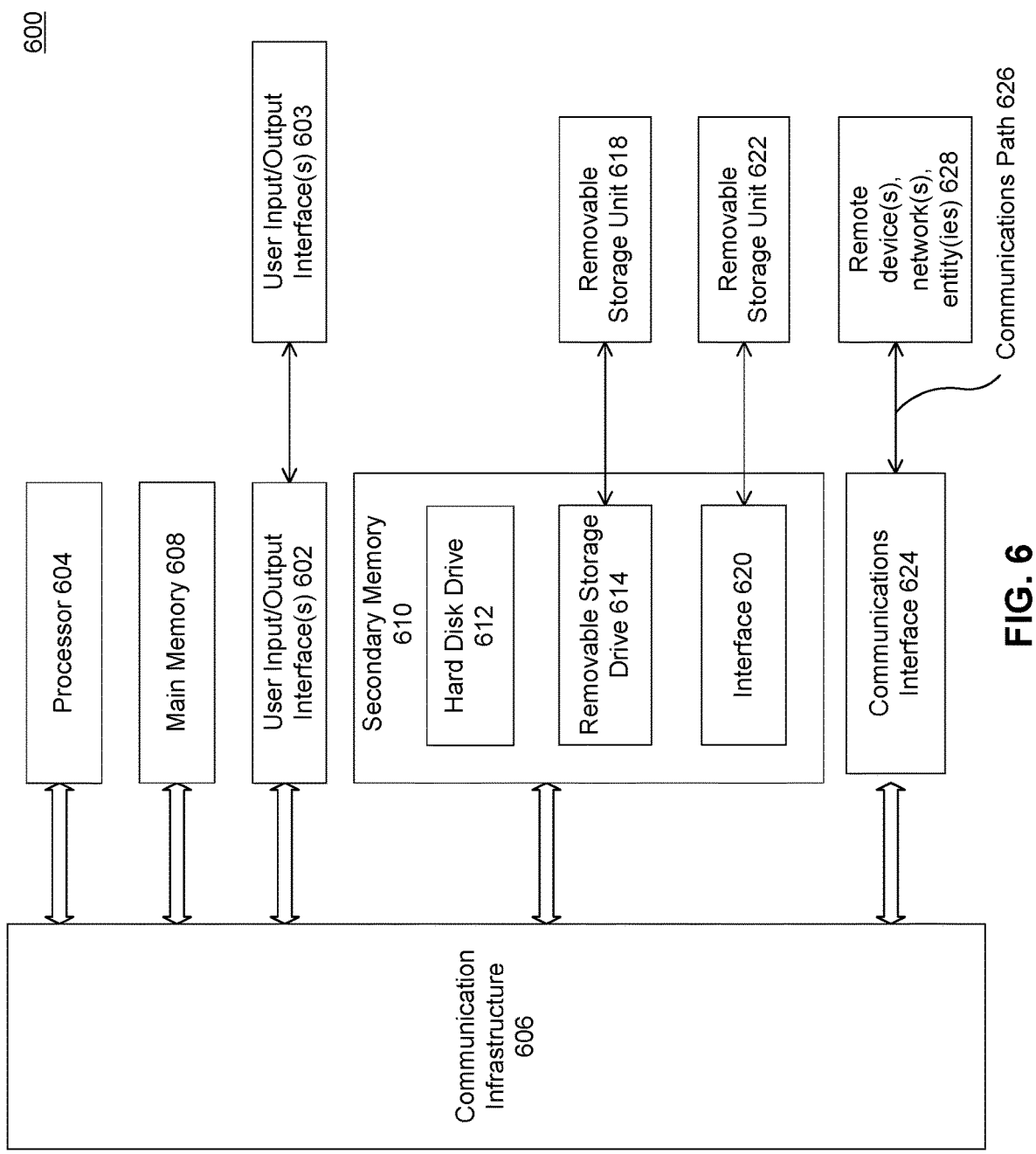
FIG. 6 is an example computer system useful for implementing various embodiments.

Various embodiments may be implemented, for example, using one or more well-known computer systems, such as computer system 600 shown in FIG. 6. One or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include customer input/output device(s) 603, such as monitors, keyboards, pointing devices, etc., which may communicate with communication infrastructure 606 through customer input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
receiving a request to open a program or file from a user;
identifying a first social media channel of a plurality of social media channels of a social media platform, wherein the first social media channel is being followed by the user on the social media platform, and wherein the first social media channel includes a plurality of media shared with the user on the first social media channel;
selecting a first item and a second item from the media shared with the user on the first social media channel;
generating a graphical social icon representing the first social media channel including both the first item and the second item, wherein the second item is behind the first item as part of the graphical social icon; and
displaying a plurality of icons, including the graphical social icon, responsive to the request, wherein a selection of the graphical social icon causes at least a portion of the social media channel to be rendered with a computing workspace.

2. The method of claim 1, wherein the computing workspace comprises an augmented reality workspace.

3. The method of claim 2, wherein the graphical social icon is three dimensional.

4. The method of claim 1, wherein the shared media comprises a video, and wherein the graphical social icon is a still frame of the video.

5. The method of claim 1, wherein the shared media comprises a video, and wherein the graphical social icon includes a portion of video that plays during the displaying and prior to the selection.

6. The method of claim 1, further comprising:
receiving the selection of the graphical social icon; and
loading the social media channel, including both text from the social media channel and the shared media responsive to the receiving the selection.

7. The method of claim 1, wherein the generating comprises:
determining that the social media channel includes a plurality of different shared media; and
generating an image corresponding to each of two or more of the plurality of different shared media, wherein the graphical social icon includes each generated image, and wherein the generated images are scrollable via the graphical social icon during the displaying.

8. A system, comprising:
a memory; and
at least one processor coupled to the memory and configured to execute instructions that cause the at least one processor to perform operations comprising:
receiving a request to open a program or file from a user;
identifying a first social media channel of a plurality of social media channels of a social media platform, wherein the first social media channel is being followed by the user on the social media platform, and wherein the first social media channel includes a plurality of media shared with the user on the first social media channel;
selecting a first item and a second item from the media shared with the user on the first social media channel;
generating a graphical social icon representing the first social media channel including both the first item and the second item, wherein the second item is behind the first item as part of the graphical social icon; and
displaying a plurality of icons, including the graphical social icon, responsive to the request, wherein a selection of the graphical social icon causes at least a portion of the first social media channel to be rendered with a computing workspace.

9. The system of claim 8, wherein the computing workspace comprises an augmented reality workspace.

10. The system of claim 9, wherein the graphical social icon is three dimensional.

11. The system of claim 8, wherein the shared media comprises a video, and wherein the graphical social icon is a still frame of the video.

12. The system of claim 8, wherein the shared media comprises a video, and wherein the graphical social icon includes a portion of video that plays during the displaying and prior to the selection.

13. The system of claim 8, wherein the operations further comprise:
receiving the selection of the graphical social icon; and
loading the social media channel, including both text from the social media channel and the shared media responsive to the receiving the selection.

14. The system of claim 8, wherein the generating comprises:
determining that the social media channel includes a plurality of different shared media, and
generating an image corresponding to each of two or more of the plurality of different shared media, wherein the graphical social icon includes each generated image, and wherein the generated images are scrollable via the graphical social icon during the displaying.

15. A non-transitory computer-readable device having instructions stored thereon that, when executed by at least one computing device, cause the at least one computing device to perform operations comprising:

receiving a request to open a program or file from a user;

identifying a first social media channel of a plurality of social media channels of a social media platform, wherein the first social media channel is being followed by the user on the social media platform, and wherein the first social media channel includes a plurality of media shared with the user on the first social media channel;

selecting a first item and a second item from the media shared with the user on the first social media channel;

generating a graphical social icon representing the first social media channel including both the first item and the second item, wherein the second item is behind the first item as part of the graphical social icon; and displaying a plurality of icons, including the graphical social icon, responsive to the request, wherein a selection of the graphical social icon causes at least a portion of the social media channel to be rendered with a computing workspace.

16. The device of claim 15, wherein the computing workspace comprises an augmented reality workspace.

17. The device of claim 16, wherein the graphical social icon is three dimensional.

18. The device of claim 15, wherein the shared media comprises a video, and wherein the graphical social icon is a still frame of the video.

19. The device of claim 15, wherein the shared media comprises a video, and wherein the graphical social icon includes a portion of video that plays during the displaying and prior to the selection.

20. The device of claim 15, wherein the operations further comprise:

receiving the selection of the graphical social icon; and loading the social media channel, including both text from the social media channel and the shared media responsive to the receiving the selection.

* * * * *